(12) United States Patent
Porter

(10) Patent No.: US 6,599,621 B2
(45) Date of Patent: Jul. 29, 2003

(54) HIGH STRENGTH STRUCTURAL INSULATED PANEL

(76) Inventor: William H. Porter, P.O. Box 249, Saugatuck, MI (US) 49453

( * ) Notice: Subject to any disclaimer, the term of this patent is extended or adjusted under 35 U.S.C. 154(b) by 38 days.

(21) Appl. No.: 09/812,404

(22) Filed: Mar. 20, 2001

(65) Prior Publication Data

US 2002/0136888 A1 Sep. 26, 2002

(51) Int. Cl.[7] .............................. B32B 3/26; B32B 5/12; B32B 27/04; B32B 9/00
(52) U.S. Cl. ............................... 428/322.2; 428/292.4; 428/107; 428/109; 428/297.4; 428/314.4; 428/318.4
(58) Field of Search .......................... 428/322.2, 292.4, 428/107, 109, 297.4, 314.4, 318.4

(56) References Cited

U.S. PATENT DOCUMENTS

| | | | |
|---|---|---|---|
| 919,057 A | 3/1909 | Moore | |
| 1,250,594 A | 12/1917 | Knapp | |
| 1,474,657 A | 11/1923 | Walper | |
| 2,111,922 A | 3/1938 | Borkenstein | 20/74 |
| 2,875,478 A | 3/1959 | Andre | 20/4 |
| 3,496,058 A | 2/1970 | Schroter et al. | 161/119 |
| 3,557,840 A | 1/1971 | Maybee | 138/149 |
| 3,654,053 A | 4/1972 | Toedter | 161/43 |
| 3,692,620 A | 9/1972 | Schmidt et al. | 161/88 |
| 3,731,449 A | 5/1973 | Kephart, Jr. | 52/631 |
| 3,753,843 A | 8/1973 | Hutchison | 161/43 |
| 3,857,217 A * | 12/1974 | Reps | 52/589 |
| 3,911,554 A | 10/1975 | Ford | 29/527 |
| 4,004,387 A | 1/1977 | Ellingson | 52/309.3 |
| 4,024,684 A | 5/1977 | Homgren | 52/127 |
| 4,032,689 A | 6/1977 | Johnson et al. | 428/55 |
| 4,037,377 A | 7/1977 | Howell et al. | 52/309.9 |
| 4,051,641 A | 10/1977 | Elliott | 52/262 |

(List continued on next page.)

Primary Examiner—Daniel Zirker
Assistant Examiner—Victor S. Chang

(57) ABSTRACT

Generally flat structural panel for building construction includes an inner insulating core such as of plastic foam and a pair of opposed outer facings, or sheets, bonded to the panel's insulating core. One of the outer facings is of gypsum composite, or gypsum fiberboard, while the other outer facing is of oriented strand board (OSB) impregnated with plastic, such as a polyisocyanurate or urethane resin. The gypsum fiberboard forms the panel's inner surface, while the plastic impregnated OSB forms the panel's outer surface. The panel's outer facings provide high tensile strength, with the gypsum fiberboard facing also affording high load bearing capacity as well as resistant to fire, the environment, and insects. The plastic impregnated OSB does not expand or contract with changes in humidity to maintain a planar configuration for the panel with a smooth, uniform surface for exterior finishing.

12 Claims, 2 Drawing Sheets

U.S. PATENT DOCUMENTS

| | | | | |
|---|---|---|---|---|
| 4,068,437 A | | 1/1978 | Byxbe et al. ................. 52/464 |
| 4,147,004 A | | 4/1979 | Day et al. ................... 52/309.9 |
| 4,169,688 A | | 10/1979 | Toshio ........................ 404/40 |
| 4,170,859 A | | 10/1979 | Counihan .................... 52/763 |
| 4,283,898 A | | 8/1981 | Claver ......................... 52/584 |
| 4,402,170 A | | 9/1983 | Seidner ....................... 52/631 |
| 4,430,833 A | | 2/1984 | Balzer et al. ................ 52/255 |
| 4,443,988 A | | 4/1984 | Coutu, Sr. ................... 52/309.9 |
| 4,471,591 A | | 9/1984 | Jamison ...................... 52/309.9 |
| 4,510,019 A | * | 4/1985 | Bartelloni ................... 162/141 |
| 4,514,532 A | * | 4/1985 | Hsu et al. ..................... 524/14 |
| 4,671,038 A | | 6/1987 | Porter ......................... 52/586 |
| 4,704,837 A | | 11/1987 | Menchetti et al. ............ 52/631 |
| 4,726,973 A | * | 2/1988 | Thompson .................. 428/45 |
| 4,765,105 A | | 8/1988 | Tissington et al. ....... 52/309.11 |
| 4,786,547 A | | 11/1988 | St-Michel ................... 428/215 |
| 4,802,837 A | * | 2/1989 | Held ........................... 425/230 |
| 4,856,244 A | | 8/1989 | Clapp ......................... 52/309.7 |
| 4,865,912 A | | 9/1989 | Mirtsumata ................. 428/285 |
| 4,932,171 A | | 6/1990 | Beattie ......................... 52/58 |
| 4,961,298 A | | 10/1990 | Nogradi ...................... 52/235 |
| 4,964,933 A | | 10/1990 | Hata et al. .................. 156/209 |
| 5,058,333 A | | 10/1991 | Schwartz ..................... 52/73 |
| 5,062,250 A | | 11/1991 | Buzzella ...................... 52/584 |
| 5,081,810 A | | 1/1992 | Emmert ....................... 52/221 |
| 5,140,086 A | * | 8/1992 | Hunter et al. ............... 527/103 |
| 5,194,323 A | * | 3/1993 | Savoy ..................... 428/305.5 |
| 5,224,315 A | | 7/1993 | Winter, IV ................. 52/309.8 |
| 5,269,109 A | | 12/1993 | Gulur ......................... 52/309.9 |
| 5,345,738 A | | 9/1994 | Dimakis .................... 52/309.9 |
| 5,428,929 A | | 7/1995 | Reese ........................ 52/288.1 |
| 5,433,050 A | * | 7/1995 | Wilson et al. ............. 52/302.1 |
| 5,497,589 A | | 3/1996 | Porter ........................ 52/309.7 |
| 5,509,242 A | | 4/1996 | Rechsteiner et al. .......... 52/270 |
| 5,519,971 A | | 5/1996 | Ramirez .................... 52/220.2 |
| 5,573,829 A | | 11/1996 | Decker ....................... 428/156 |
| 5,628,158 A | | 5/1997 | Porter ........................ 52/309.9 |
| 5,638,651 A | | 6/1997 | Ford ........................... 52/309.7 |
| 5,641,553 A | | 6/1997 | Tingley ...................... 428/114 |
| 5,755,068 A | | 5/1998 | Ormiston .................... 52/314 |
| 5,842,314 A | | 12/1998 | Porter ........................ 52/309.7 |
| 5,950,389 A | | 9/1999 | Porter ........................ 52/586.1 |
| 5,953,883 A | | 9/1999 | Ojala ......................... 52/794.1 |
| 6,136,408 A | * | 10/2000 | Radcliffe et al. ........... 428/107 |
| 6,240,704 B1 | * | 6/2001 | Porter ........................ 52/94.1 |

* cited by examiner

HIGH STRENGTH STRUCTURAL INSULATED PANEL

FIELD OF THE INVENTION

This invention relates generally to structural panels for building construction and is particularly directed to high strength structural insulated panels which are highly resistant to bending or bowing such as caused by exposure to moisture or changes in humidity.

BACKGROUND OF THE INVENTION

Structural insulated panels are gaining increasing acceptance in building construction in replacing the conventional combination of drywall sheets and rolls of fiberglass insulation. The typical structural insulated panel includes an inner insulating core such as of plastic foam and at least one outer facing comprised of a rigid material such as gypsum or cementous composite, oriented strand board (OSB), or an agricultural board product such as strawboard. While a facing of gypsum or cementous composite is highly resistant to moisture, OSB or an agricultural board product is sensitive to changes in humidity. For example, OSB expands, or swells, when exposed to water or increased humidity. This OSB expansion is irreversible as the OSB does not return to its original size or shape with a return to lower humidities. This causes a bowing, or warping, of the structural insulated panel. If this occurs prior to installation, the structural insulated panel is generally not usable and must be discarded. If this occurs after the structural insulated panel has been installed in a building structure, the panel may develop cracks, become detached from the underlying support structure, or may result in a distorted wall or ceiling structure requiring panel replacement.

The present invention addresses the aforementioned limitations of the prior art by providing a high strength structural insulated panel including an inner insulating core with a gypsum fiberboard facing disposed on a first surface of the insulating core and an OSB facing incorporating a polyisocyanurate or urethane resin disposed on a second opposed surface which renders the panel highly resistant to water and changes in humidity.

OBJECTS AND SUMMARY OF THE INVENTION

Accordingly, it is an object of the present invention to provide a high strength, lightweight structural insulated panel which is highly resistant to fire, insects and the environment, particularly to water and changes in humidity.

It is another object of the present invention to provide a structural insulated panel which can be machined on site and is easily adapted for a particular installation.

It is a further object of the present invention to provide a structural insulated panel for building construction which has high dimensional stability over a wide range of various environmental parameters.

The present invention contemplates an insulated structural panel comprising a generally flat insulating core having first and second opposed generally planar surfaces; a first outer facing attached to the first surface of the insulating core and comprised of oriented strand board incorporating a polyisocyanurate or urethane resin; and a second outer facing attached the second surface of the insulating core and comprised of gypsum fiberboard incorporating fiber reinforcing particles.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
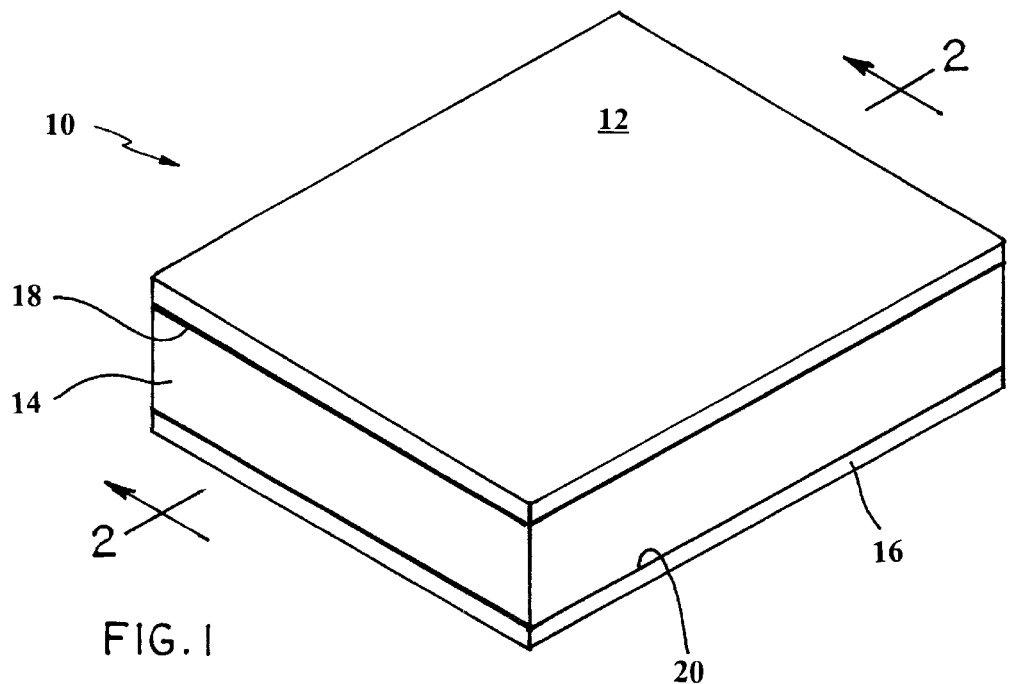
FIG. 1 is a perspective view of a structural insulated panel in accordance with one embodiment of the present invention
Figure 2:
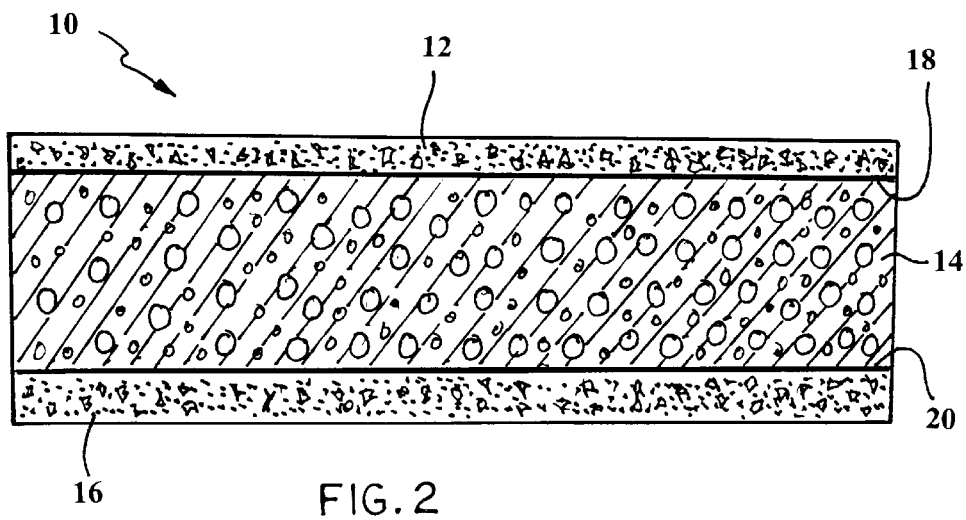
FIG. 2 is a sectional view of the structural insulated panel shown in FIG. 1 taken along sight line 2—2 therein.

Referring to FIG. 1, there is shown a perspective view of a structural insulated panel 10 in accordance with one embodiment of the present invention. A sectional view of the structural insulated panel 10 shown in FIG. 1 taken along sight line 2—2 therein is shown in FIG. 2.

Structural insulated panel 10 includes first and second outer facings 12 and 16 disposed on opposed outer surfaces of a generally planar insulating inner core 14. Structural insulated panel 10 is shown as generally rectangular in shape, but may take on virtually any of the more common shapes assumed by structural panels in building construction. Insulating inner core 14 is preferably comprised of a plastic foam such as expanded polystyrene or urethane and is securely affixed to first and second outer facings 12, 16. Adhesive layers 18 and 20 may be used to securely affix the first and second outer facings 12, 16 to the opposed outer surfaces of the panel's insulating inner core 14. Adhesive layers 18, 20 are comprised of any of the more common adhesive materials such as urethane cement, a polyisocyanurate binder, mastic, or glue. At least one of the outer facings is comprised of oriented strand board (OSB) impregnated with a resin binder such as polyisocyanurate or urethane resin. The other outer facing is preferably comprised of gypsum fiberboard. Thus, in FIGS. 1 and 2 the first outer facing 12 is comprised of OSB impregnated with a polyisocyanurate or urethane resin, while the second outer facing 16 is comprised of gypsum fiberboard.

The second outer facing 16 comprised of gypsum fiberboard includes rock gypsum, flue gas desulphurated gypsum (FGD) or other gypsum byproducts, and fibers such as of paper or wood. The fibers in the gypsum fiberboard substantially increase the tensile strength of the fiberboard. The incorporation of the polyisocyanurate or urethane resin in the OSB renders the OSB substantially more rigid and higher in strength, while also providing substantially increased moisture resistance in the OSB. The polyisocyanurate or urethane resin reduces the extent of separation of particles in the OSB which occurs in conventional OSB when exposed to water or increased humidity. This prevents the OSB from bending, or bowing, in the presence of water or high humidity as occurs in conventional OSB. Maintaining the planar shape and the smooth, uniform outer surfaces of the structural insulated panel even when exposed to water or increased humidity facilitates panel installation and reduces panel rejections. Structural insulated panels in accordance with the present invention thus may be stored for extended periods under a wide range of environmental conditions. The inventive structural insulated panels also retain their original planar configuration after installation in a building structure and thus do not crack or become detached or disconnected as a result of exposure to water or increased humidity. Because the inventive structural insulated panels are less susceptible to bowing as a result of exposure to water or changes in the humidity, they are also less likely to have to be replaced once installed in a wall or ceiling structure. Because of these characteristics, OSB having polyisocyanurate or urethane resin as a binder is the preferred outer surface for the inventive structural insulated panel particularly when incorporated in an exterior wall of a building structure.

The increased structural integrity of the panel's OSB-impregnated first outer facing 12 and its fiber reinforced gypsum fiberboard second outer facing 16 allow the edges of the panel to be beveled or machined as required for a particular installation. Panels of conventional wallboard cannot be beveled or machined along their edges because of the tendency of the inner gypsum sheet to crumble or flake off when subjected to mechanical working.

Figure 3:
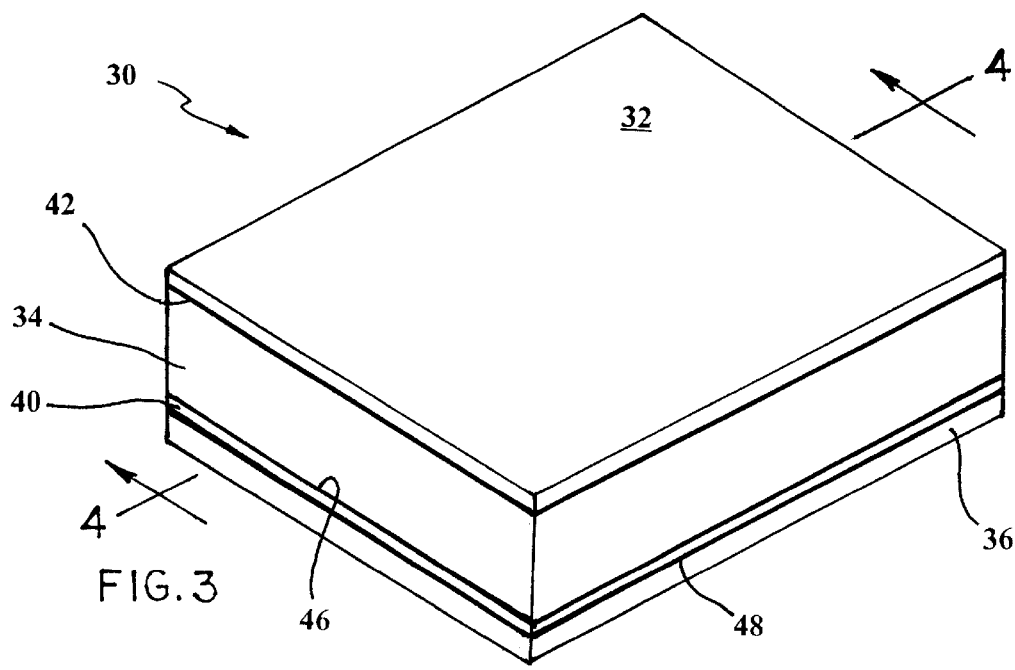
FIG. 3 is a perspective view of a structural insulated panel in accordance with another embodiment of the present invention.
Figure 4:
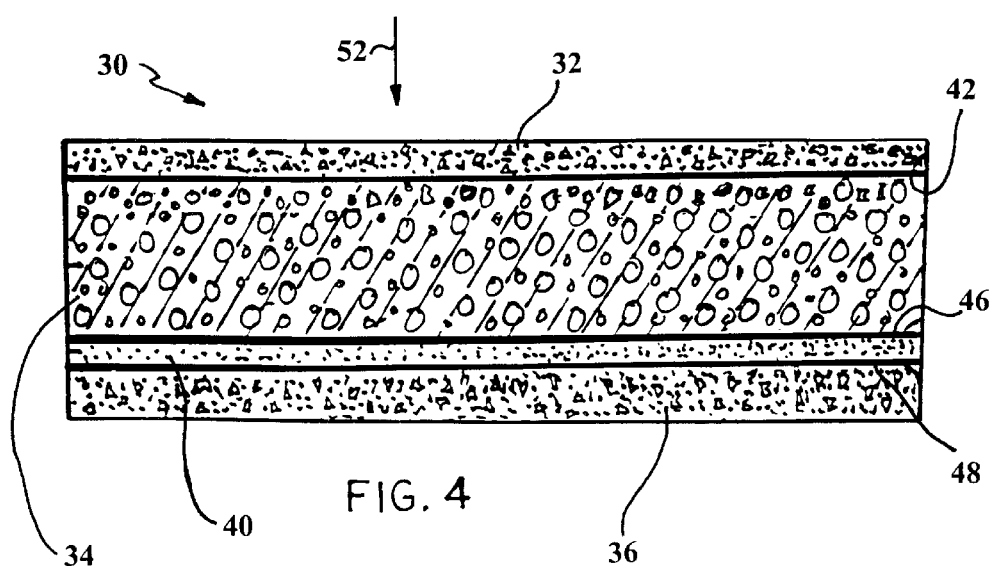
FIG. 4 is a sectional view of the structural insulated panel shown in FIG. 3 taken along sight line 3—3 therein.

Referring to FIG. 3, there is shown a perspective view of another embodiment of a structural insulated panel 30 in accordance with the principles of the present invention. A sectional view of the structural insulated panel 30 taken along sight line 44 in FIG. 3 is shown in FIG. 4.

As in the previously described embodiment, structural insulated panel 30 includes a first outer facing 32 preferably comprised of OSB containing a polyisocyanurate or urethane resin for increasing the strength of the outer facing as well as its resistance to water and humidity. Structural insulated panel 30 further includes a second outer facing 36 preferably comprised of gypsum fiberboard as previously described. The first outer facing 32 is affixed to a first generally planar surface of an insulating inner core 32 such as of plastic foam. Attached to a second, opposed, generally planar surface of the panel's insulating inner core 34 is a plastic impregnated paper sheet 40. The plastic impregnated paper sheet 40 is preferably comprised of paper or box board impregnated with a urethane or polyisocyanurate plastic. This plastic impregnated paper is commercially available from Weyerhaeuser and is sold under the trade name P-Cell. The panel's second outer facing 36 is attached to the outer surface of the plastic impregnated paper sheet 40. The plastic impregnated paper sheet 40 serves as a vapor barrier to prevent the passage of moisture through the structural insulated panel 30 and also substantially increases the panel's tensile strength. The plastic impregnated paper sheet 40 introduced between and adhered to the panel's insulating inner core 34 and its second outer facing 36 permits the panel to withstand large transverse loads when the plastic impregnated paper sheet/second outer facing of the panel is in tension. For example, the structural insulated panel 30 can accommodate substantially larger vertical loads applied downward in a vertical direction in the direction of arrow 52 in FIG. 4 such as from the weight of snow than a panel without the plastic impregnated paper sheet. The strength of the plastic impregnated paper sheet 40 may be further increased by also impregnating the paper sheet with fiberglass. A first adhesive layer 42 is disposed between and connects the panel's first outer facing 32 to its insulating inner core 34, while a second adhesive layer 46 is disposed between and connects the panel's plastic impregnated paper sheet 40 to its insulating inner core. A third adhesive layer 48 is disposed between and connects the panel's second outer facing 36 to its plastic impregnated paper sheet 40. The first, second and third adhesive layers 42, 46 and 48 may be comprised of a conventional adhesive material such as expanded polystyrene, urethane, mastic or epoxy cement or glue.

There has thus been shown a generally planar structural insulated panel for building construction which includes an insulating inner core and first and second outer facings disposed on and attached to opposed surfaces of the insulating inner core. The insulating inner core is preferably of a plastic foam, while the first outer facing is of gypsum fiberboard, or composite, and the second outer facing is of oriented strand board (OSB) impregnated with a plastic such as a polyisocyanurate or urethane resin. The plastic foam is in the form of polystyrene foam, extruded styrene foam, urethane foam, polyisocyanurate foam or any such foam insulator used in these types of insulated structural members. In a building structure, the first outer facing of gypsum fiberboard forms the panel's inner surface, while the plastic impregnated OSB forms the panel's outer surface. Adhesive layers such as of expanded polystyrene, urethane, mastic, or epoxy cement or glue bind the first and second outer facings to the opposed outer surfaces of the panel's insulating inner core. The two outer facings provide the panel with high tensile strength, with the gypsum composite facing further providing high load bearing capacity as well as resistance to fire, the environment, and insects. The plastic impregnated OSB facing is weather resistant and does not change in shape or in surface texture or smoothness when exposed to water or changes in humidity to facilitate exterior finishing. Another embodiment of the present invention further includes a sheet of high strength plastic impregnated paper disposed between and bonded to a surface of the panel's insulating inner core and to one of its outer facings to further increase the panel's strength and provide the panel with a moisture barrier.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. An insulated structural panel comprising:
   a generally flat insulating core having first and second opposed generally planar surfaces;
   a first outer facing attached to the first surface of said insulating core and comprised of oriented strand board impregnated throughout with a polyisocyanurate or urethane resin; and
   a second outer facing attached to the second surface of said insulating core and comprised of gypsum fiberboard.

2. The insulated structural panel of claim 1 wherein said insulating core is comprised of a plastic foam.

3. The insulated structural panel of claim 2 wherein said plastic foam is selected from the group consisting of expanded polystyrene foam, urethane foam, extruded styene foam and polysocanurate foam.

4. The insulated structural panel of claim 1 further comprising first and second adhesive layers respectively disposed between and bonding said insulating core to said first outer facing and to said second outer facing.

5. The insulated structural panel of claim 4 wherein said first and second adhesive layers are selected from the group consisting of expanded polystyrene, urethane, mastic and epoxy cement or glue.

6. The insulated structural panel of claim 1 wherein said first outer facing forms an outer surface of the insulated structural panel and said second outer facing forms an inner surface of the insulated structural panel when incorporated in a building structure.

7. The insulated structural panel of claim 1 further comprising a high tensile strength plastic impregnated paper sheet disposed intermediate and bonded to said insulating core and to either said first outer facing or to said second outer facing.

8. The insulated structural panel of claim 7 wherein said plastic impregnated paper sheet is impregnated with a material selected from the group consisting of urethane, polystyrene and polyisocyanurate.

9. The insulated structural panel of claim 8 further comprising third and fourth layers of an adhesive respectively disposed between and bonding said plastic impregnated paper sheet to said insulating core and to either said first outer facing or said second outer facing.

10. The insulated structural panel of claim 9 wherein said third and fourth adhesive layers are selected from the group consisting of expanded polystyrene, urethane, mastic, epoxy cement and glue.

11. The insulated structural panel of claim 11 wherein said fiber reinforcing particles include paper, wood or fiberglass.

12. The insulated structural panel of claim 1 wherein said second outer facing of gypsum fiberboard includes fiber reinforcing particles.

* * * * *

UNITED STATES PATENT AND TRADEMARK OFFICE
CERTIFICATE OF CORRECTION

PATENT NO. : 6,599,621 B2
DATED : July 29, 2003
INVENTOR(S) : William H. Porter

It is certified that error appears in the above-identified patent and that said Letters Patent is hereby corrected as shown below:

<u>Title page,</u>
Item [56], References Cited, OTHER PUBLICATIONS, please insert the following publication:
-- Gypsum Fiberboard: A $1 Billion Market?" by Frederick T. Kurpiel, Wood Technology Clinic & Show, March 1998. --

<u>Column 4,</u>
Line 66, delete "styene" and insert -- styrene -- in its place.

<u>Column 6,</u>
Line 13, change the numbering of claim "11" to -- claim 12 -- and position it as the last claim in the column.
Line 15, change the numbering of claim "12" to claim -- 11 --.

Signed and Sealed this

Fourth Day of November, 2003

JAMES E. ROGAN
*Director of the United States Patent and Trademark Office*